(12) United States Patent
Sakaitani et al.

(10) Patent No.: US 12,047,511 B2
(45) Date of Patent: Jul. 23, 2024

(54) INFORMATION PROCESSING SYSTEM AND INFORMATION PROCESSING METHOD

(71) Applicant: ARTRIGGER INC., Tokyo (JP)

(72) Inventors: Madoka Sakaitani, Tokyo (JP); Kenichi Mogi, Tokyo (JP)

(73) Assignee: Madoka Sakaitani, Tokyo (JP)

( * ) Notice: Subject to any disclaimer, the term of this patent is extended or adjusted under 35 U.S.C. 154(b) by 612 days.

(21) Appl. No.: 17/157,822

(22) Filed: Jan. 25, 2021

(65) Prior Publication Data

US 2021/0152368 A1 May 20, 2021

Related U.S. Application Data

(63) Continuation of application No. PCT/JP2019/028218, filed on Jul. 18, 2019.

(30) Foreign Application Priority Data

Jul. 30, 2018 (JP) .................................. 2018-142382

(51) Int. Cl.
- *H04L 9/32* (2006.01)
- *G06F 21/32* (2013.01)
- *G06F 21/64* (2013.01)

(52) U.S. Cl.
CPC ............ *H04L 9/3247* (2013.01); *G06F 21/32* (2013.01); *G06F 21/64* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 6,553,494 B1 * | 4/2003 | Glass | ...................... | G06F 21/64 |
| | | | | 713/176 |
| 10,972,281 B2 * | 4/2021 | Scott | ..................... | H04L 9/3247 |
| (Continued) | | | | |

FOREIGN PATENT DOCUMENTS

| | | |
|---|---|---|
| CN | 103465649 A | 12/2013 |
| EP | 1292882 A1 | 3/2003 |
| (Continued) | | |

OTHER PUBLICATIONS

International Search Report in PCT Application No. PCT/JP2019/028218, mailed Oct. 15, 2019, 7pp.

(Continued)

*Primary Examiner* — Fatoumata Traore
(74) *Attorney, Agent, or Firm* — HAUPTMAN HAM, LLP (57) ABSTRACT

An information processing system includes an image capturing device and a display device, wherein the image capturing device includes a biometric information acquisition part that acquires biometric information, an authenticating part that authenticates whether or not the biometric information matches registered biometric information registered in advance, an image capturing part that permits capturing of an image on a condition that authentication by the authenticating part is successful, an encryptor that encrypts image data captured by the image capturing part to generate encrypted data, and a data output part that outputs the encrypted data to the display device via a connecting terminal connected to the display device. The display device includes an acquisition part that acquires the encrypted data via a terminal connected to the image capturing device, a decryptor that decrypts the encrypted data, and a display that displays the image data decrypted and acquired by the decryptor.

8 Claims, 5 Drawing Sheets

(56) References Cited

U.S. PATENT DOCUMENTS

| | | |
|---|---|---|
| 2002/0034300 A1 | 3/2002 | Thuvesholmen et al. |
| 2004/0196370 A1 | 10/2004 | Yaegashi |
| 2009/0095543 A1* | 4/2009 | Lapstun ................ G06F 3/0321 |
| | | 178/19.01 |
| 2011/0016319 A1 | 1/2011 | Lundberg et al. |
| 2016/0253557 A1 | 9/2016 | Kaminogo et al. |
| 2017/0364701 A1 | 12/2017 | Struttmann |
| 2019/0253260 A1 | 8/2019 | Uehara et al. |

FOREIGN PATENT DOCUMENTS

| | | | |
|---|---|---|---|
| EP | 1292882 B1 | 7/2006 | |
| JP | 2001306273 A | 11/2001 | |
| JP | 2003536299 A | 12/2003 | |
| JP | 2004171488 A | 6/2004 | |
| JP | 2004171488 A * | 6/2004 | |
| JP | 2004312267 A | 11/2004 | |
| JP | 2008186 A | 1/2008 | |
| JP | 2008242708 A | 10/2008 | |
| JP | 2009187260 A | 8/2009 | |
| JP | 2010226506 A | 10/2010 | |
| JP | 2010226621 A | 10/2010 | |
| JP | 201143798 A | 3/2011 | |
| JP | 2013207369 A | 10/2013 | |
| JP | 2014146184 A | 8/2014 | |
| JP | 2016162027 A | 9/2016 | |
| JP | 2017204704 A | 11/2017 | |
| JP | 6340107 B1 | 6/2018 | |
| WO | WO-0135349 A1 * | 5/2001 | ............... G06K 9/00 |
| WO | 0195091 A1 | 12/2001 | |

OTHER PUBLICATIONS

Written Opinion in PCT Application No. PCT/JP2019/028218, mailed Oct. 15, 2019, 18pp.

Office Action in JP Application No. 2018-142382, mailed Aug. 14, 2018, 12pp.

Office Action in JP Application No. 2018-142382, mailed Sep. 25, 2018, 13pp.

Request for Trial in JP Application No. 2018-142382, filed Nov. 14, 2018, 13pp.

Office Action in JP Application No. 2018-142382, mailed Aug. 6, 2019, 24pp.

* cited by examiner

INFORMATION PROCESSING SYSTEM AND INFORMATION PROCESSING METHOD

CROSS-REFERENCE TO RELATED APPLICATIONS

The present application is a continuation application of International Application number PCT/JP2019/028218, filed on Jul. 18, 2019, which claims priority under 35 U.S.C. § 119(a) to Japanese Patent Application No. 2018-142382, filed on Jul. 30, 2018. The contents of this application are incorporated herein by reference in their entirety.

BACKGROUND OF THE DISCLOSURE

The present disclosure relates to an information processing system and an information processing method and, more particularly, to a technique for securely storing and displaying a captured image.

It is common practice to affix a signature or seal (hereinafter simply referred to as "signature or the like") to a document, such as a work of an artist and its certificate, a contract made for transactions of real estate or high-value movable property, or an employment contract, and the like to prove any intention or claim. The signature or the like affixed to the document is then verified for authenticity if necessary. However, in Japan, there is no one in a position of being responsible for the verification of authenticity of a signature or the like, and it is the current situation that an interested party or the like of a matter related to a document having a signature or the like affixed thereto determines the authenticity. Therefore, there is no responsibility for the determination result, and the authenticity management of a signature or the like is inevitably insufficient.

For this reason, it is conceivable that a document having a signature or the like affixed is captured to generate image data, and the image data is safely stored together with its time of generation to be used for post-hoc authenticity verification. For example, Japanese Unexamined Patent Application Publication No. 2001-306273 proposes a technique for safely storing image data.

BRIEF SUMMARY OF THE DISCLOSURE

Such a technique is a technique for storing image data on a remote server through a network. While techniques for maintaining network security are advancing on a daily basis, techniques for cracking and the like are also evolving on a daily basis. The techniques for maintaining network security and the techniques for breaking it are producing aspects of a vicious circle, and the reliability of original data cannot always be guaranteed by storing the image data using the above technique.

The present disclosure focuses on these points, and an object of the present disclosure is to provide a technique for improving reliability of storage of image data.

The first aspect of the present disclosure is an information processing system. This system includes an image capturing device and a display device that displays an image captured by the image capturing device. The image capturing device includes a biometric information acquisition part that acquires biometric information, an authenticating part that verifies whether the biometric information acquired by the biometric information acquisition part matches registered biometric information registered in advance, an image capturing part that permits capture of an image on a condition that authentication by the authenticating part is successful, an encryptor that encrypts image data captured by the image capturing part to generate encrypted data, and a data output part that outputs the encrypted data to the display device via a connecting terminal connected to the display device. The display device includes an acquisition part that acquires the encrypted data via a terminal connected to the image capturing device, a decryptor that decrypts the encrypted data acquired by the acquisition part, and a display that displays the image data decrypted and acquired by the decryptor.

The second aspect of the present disclosure is an information processing method performed in an information processing system including an image capturing device and a display device. The method performed by the image capturing device includes acquiring biometric information, verifying whether the acquired biometric information matches registered biometric information registered in advance, permitting capture an image on a condition that the authentication is successful, encrypting captured image data to generate encrypted data, and outputting the encrypted data to the display device via a connecting terminal connected to the display device. The information processing method performed by the display device includes acquiring the encrypted data through a terminal connected to the image capturing device, decrypting the acquired encrypted data, and displaying the decrypted and acquired image data on a display included in the display device.

It should be noted that any combination of the above-described constituent elements, and an aspect obtained by converting the expression of the present invention among methods, devices, systems, computer programs, data structures, recording media, and the like are also effective as an aspect of the present invention.

DETAILED DESCRIPTION OF THE DISCLOSURE

Summary of the Embodiment

An outline of an embodiment will be described. An information processing system according to the embodiment includes an image capturing device and a display device. The image capturing device has a biometric authentication function, and is configured to perform authentication using biometric information of a user registered in advance, and to permit capturing of an image on a condition that the authentication is successful.

The image capturing device encrypts image data acquired by capturing an image using a cryptographic key stored in a read-only memory by a manufacturer of the image capturing device when manufacturing the image capturing device, and then stores the encrypted image data in the image capturing device in association with a capturing time of the image data.

The display device is a device for displaying the image data captured by the image capturing device. A cryptographic key paired with the cryptographic key stored in the image capturing device is stored in a read-only memory in the display device by a manufacturer of the display device when manufacturing the display device. The display device decrypts the encrypted data acquired from the image capturing device using the cryptographic key stored in the read-only memory. The display device displays the image data acquired through this decrypting on a display of the display device.

Here, the image capturing device and the display device exchange encrypted data via connecting terminals in physical contact. The image capturing device performs the authentication using the biometric information of the user registered in advance, and outputs the encrypted data to the display device on a condition that the authentication is successful. Further, the display device does not have a video output function to an external device, and is configured to display the image data only on the display of the display device. It should be noted that the display device may be set to automatically delete the image data from the display device upon a lapse of a predetermined period of time (for example, 10 minutes) after the display of the image data is ended.

In addition, only one display device has the cryptographic key that forms a pair with the cryptographic key held by the image capturing device. Therefore, even if the encrypted data stored in an image capturing device is outputted to a display device, the display device cannot display the image data unless the display device has the cryptographic key for decrypting the encrypted data acquired from the image capturing device.

As described above, in the information processing system according to the embodiment, only those who are successfully authenticated by the biometric authentication function provided in the image capturing device can use the image capturing function. Further, the image data captured by the image capturing device can be browsed only with a dedicated display paired with the image capturing device. Data is exchanged between the image capturing device and the display device by wireline, and the display device does not have an output function. Therefore, it is difficult for a third party to access the image data captured by the image capturing device. As a result, the information processing system according to the embodiment can improve the reliability of the storage of the image data.

<An Entire Configuration of an Information Processing System S>

Figure 1:
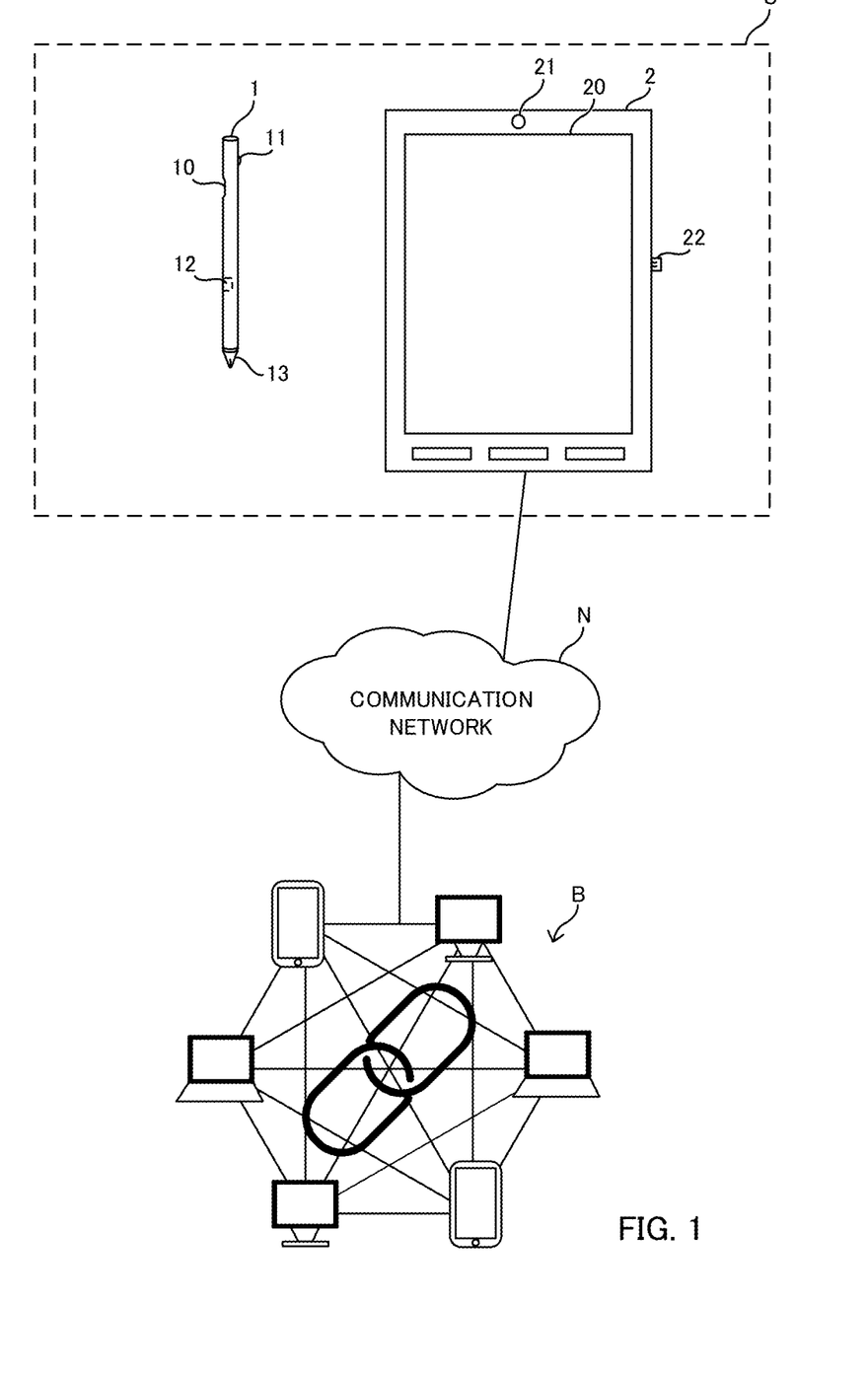
FIG. 1 schematically shows an entire configuration of an information processing system according to the embodiment.

FIG. 1 schematically shows an entire configuration of an information processing system S according to the embodiment. As described above, the information processing system S according to the embodiment includes an image capturing device 1 and a display device 2. Here, the display device 2 can be connected to a blockchain B, which is a type of database realized by a plurality of computers, in a communicable manner via a communication network N.

The image capturing device 1 includes a biometric information acquisition part 10, an image capturing part 11, and a connecting terminal 12. Further, the image capturing device 1 illustrated in FIG. 1 also includes a nib 13. The display device 2 includes a display 20, a display device image capturing part 21, and a connecting terminal 22. The connecting terminal 12 provided to the image capturing device 1 is a so-called female connecting terminal.

On the other hand, the connecting terminal 22 provided to the display device 2 is a so-called male connecting terminal. The connecting terminal 22 is inserted into the connecting terminal 12 such that the connecting terminal 12 and the connecting terminal 22 come into contact with each other, thereby forming a path for the image capturing device 1 to output the encrypted data to the connecting terminal 22. Further, since the image capturing device 1 has a female connecting terminal, the terminal is accommodated in a housing of the image capturing device 1 and does not protrude to the outside of the image capturing device 1. This allows the connecting terminal 12 to avoid hindering writing when the user uses the image capturing device 1 as a writing instrument.

The display device 2 can also access the blockchain B configured on a network via the communication network N, such as the Internet. As will be described in more detail later, when new encrypted data is acquired from the image capturing device 1, the display device 2 generates a hash value of the acquired encrypted data. The display device 2 registers the generated hash value in the blockchain B through the communication network N.

As shown in FIG. 1, the blockchain B includes a plurality of terminals existing on the network. As is well known, a blockchain can also be regarded as one distributed database technique in which a huge ledger recording a history of transactions of all participating terminals is shared by all participating terminals. A plurality of terminals shares the same information, and the validity of the information is determined by the majority vote of the participating terminals. Therefore, in order to tamper with the information stored in the blockchain, it is necessary to tamper with the information stored in each of more than the majority of participating terminals at the same time, and therefore a blockchain is said to be a database that is difficult to tamper with.

The display device 2 can also verify the validity of the image data as digital information if necessary, by storing the hash value of the encrypted data in the secure blockchain B. As a result, the information processing system S can further improve the reliability of the storage of the image data. Further, because the blockchain B existing on the communication network N is not the image data itself but the hash value of the data acquired by encrypting the image data, even if the information stored in the blockchain B is leaked to a third party, it is virtually impossible to specify the image data from that.

Figure 2A:
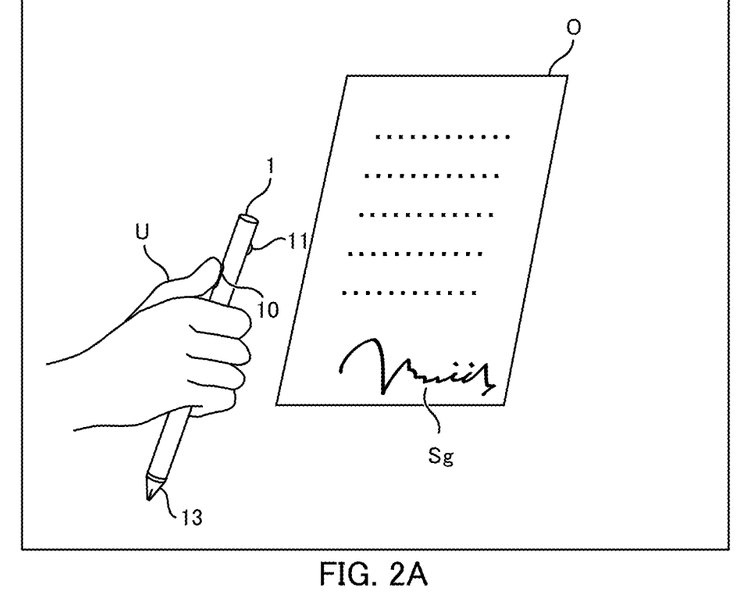
FIGS. 2A and 2B each schematically show an exemplary use scene of the information processing system according to the embodiment.
Figure 2B:
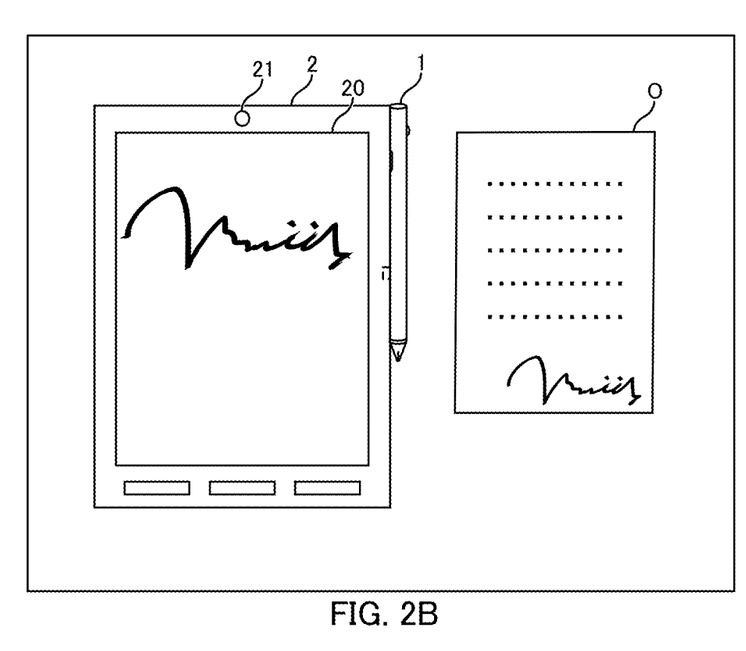

FIGS. 2A and 2B schematically show exemplary use scenes of the information processing system S according to the embodiment. Specifically, FIG. 2A shows a situation where an image is captured using the image capturing device 1, and FIG. 2B shows a state where the display device 2 displaying the image data.

In the image capturing device 1 shown in FIGS. 2A and 2B, the biometric information acquisition part 10 is a sensor for acquiring a fingerprint of a user U as the biometric information. Although not limited thereto, the sensor included in the biometric information acquisition part 10 can be pressed by a finger, and the image capturing part 11 is configured to capturing an image in response to the biometric information acquisition part 10 being pressed. Specifically, the biometric information acquisition part 10 acquires fingerprint information of the user U at the time when a finger of the user U touches the biometric information acquisition part 10, and if the fingerprint information is successfully authenticated, the image capturing part 11 captures an image and generates the image data in conjunction with the pressing of the biometric information acquisition part 10.

It should be noted that the image capturing part 11 may capture an image after a predetermined period has passed from the user U's instruction (pressing of the biometric information acquisition part 10 in the case shown in FIG. 2) to capture an image. At this time, the image capturing part 11 may cause an audio output part (not shown in figures) provided to the image capturing device 1 to output a countdown in audio for providing notification about the time remaining before capturing an image. This allows the image capturing part 11 to indicate to the user U when the image capturing will be performed, thereby improving the convenience of the user U when capturing an image. The predetermined period of time may be set by the user U.

FIG. 2A shows an example in which an imaging object O of the image capturing part 11 is a contract. As shown in FIG. 2A, a signature Sg of the user U is affixed on the contract which is the imaging object O. Thus, the user U can store, in the image capturing device 1, the image data acquired by capturing an image of the contract to which the signature Sg of the user U is affixed.

FIG. 2B shows a situation where the connecting terminal 12 of the image capturing device 1 and the connecting terminal 22 of the display device 2 are connected. In response to the connecting terminal 12 of the image capturing device 1 and the connecting terminal 22 of the display device 2 being connected, the encrypted image data stored in the image capturing device 1 is outputted to the display device 2. FIG. 2B shows a situation where the signature Sg of the user U in the image data stored in the image capturing device 1 is enlarged and displayed on the display 20. The user U can provide information for verifying the authenticity of the signature Sg by arranging the signature Sg displayed on the display 20 and the imaging object O side by side.

<Functional Configurations of the Image Capturing Device 1 and the Display Device 2 According to the Embodiment>

Subsequently, functional configurations of the image capturing device 1 and the display device 2 for realizing the above-described information processing system S are described in detail.

Figure 3:
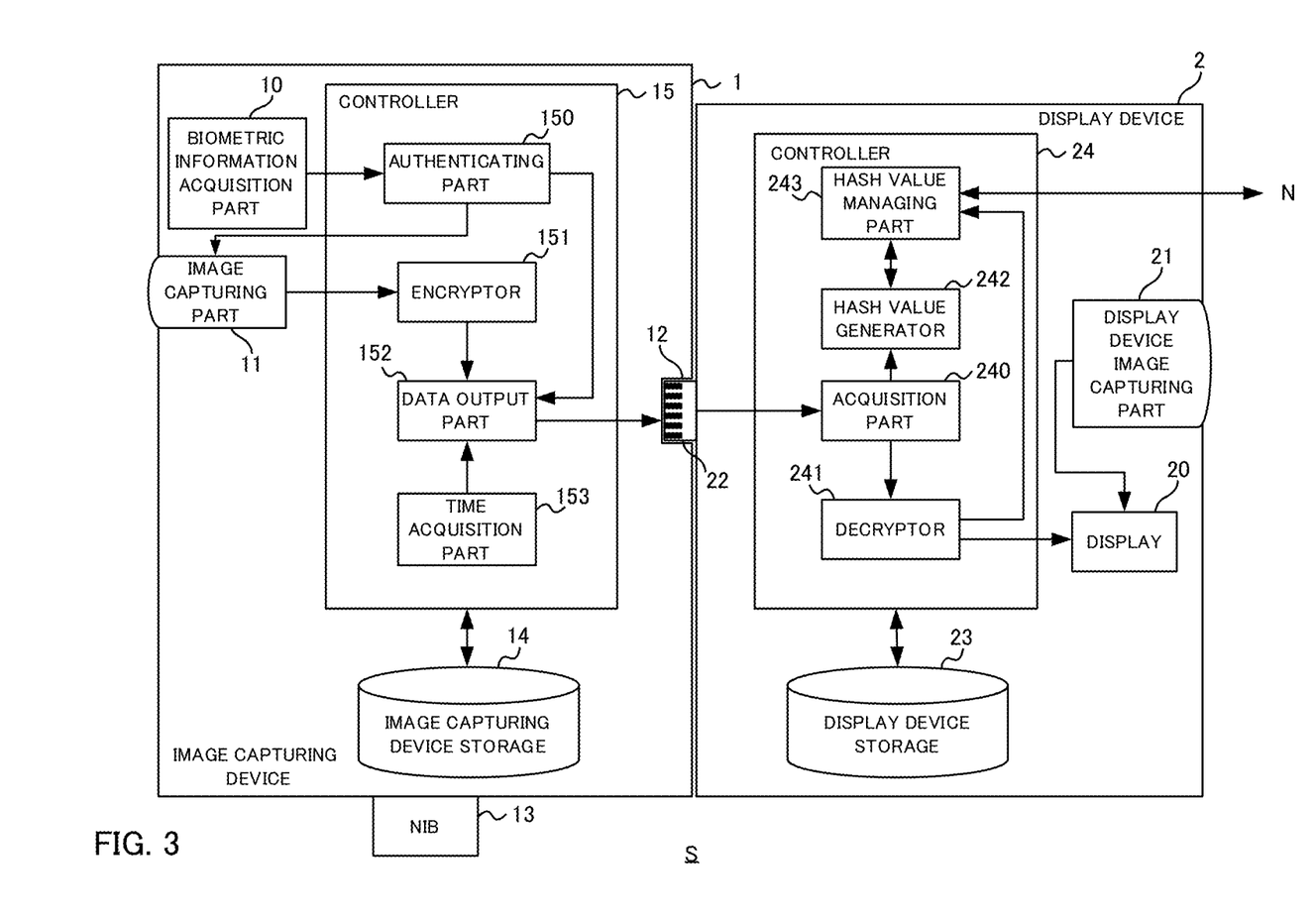
FIG. 3 schematically shows functional configurations of an image capturing device and a display device according to the embodiment.

FIG. 3 schematically shows the functional configurations of the image capturing device 1 and the display device 2 according to the embodiment. The image capturing device 1 includes the biometric information acquisition part 10, the image capturing part 11, the connecting terminal 12, the nib 13, an image capturing device storage 14, and a controller 15. Further, the display device 2 includes the display 20, the display device image capturing part 21, the connecting terminal 22, a display device storage 23, and a controller 24.

In FIG. 3, arrows indicate the main data flow, and there may be data flows not shown in FIG. 3. In FIG. 3, functional blocks are not hardware-based (device) configurations, but are function-based configuration. As such, the functional blocks shown in FIG. 3 may be implemented in a single device, or may be implemented separately in a plurality of devices. The transfer of data between the functional blocks may be performed via any means, such as a data bus, a network, a portable storage medium, or the like.

The image capturing device storage 14 is a mass storage device such as a Read Only Memory (ROM) for storing a Basic Input Output System (BIOS) of a computer that realizes the image capturing device 1, a Random Access Memory (RAM) for a work area of the image capturing device 1, and a Hard Disk Drive (HDD) and a Solid State Drive (SSD) for storing various information including an Operating System (OS) and an application program, and various databases referenced when executing the application program.

Similarly, the display device storage 23 is a mass storage device such as a ROM for storing a BIOS of a computer that realizes the display device 2, a RAM for a work area of the display device 2, and an HDD or an SSD for storing various types of information including an OS and an application program referenced when executing the application program.

The controller 15 is a processor such as a Central Processing Unit (CPU) or a Graphics Processing Unit (GPU) of the image capturing device 1, and functions as an authenticating part 150, an encryptor 151, a data output part 152, and a time acquisition part 153 by executing the program stored in the image capturing device storage 14.

Similarly, the controller 24 is a processor such as a CPU or a GPU of the display device 2, and functions as an acquisition part 240, a decryptor 241, a hash value generator 242, and a hash value managing part 243 by executing the program stored in the display device storage 23.

The biometric information acquisition part 10 of the image capturing device 1 acquires the biometric information of the user U of the image capturing device 1. Here, the "biometric information" is information used for biometric authentication, and is information representing a physical feature of a human Examples of the biometric information include, but are not limited to, fingerprint information, iris information, voiceprint information, vein patterns, and the like.

The authenticating part 150 verifies whether the biometric information acquired by the biometric information acquisition part 10 matches the registered biometric information registered in advance. Here, the "registered biometric information registered in advance" is, for example, the biometric information of the user U himself/herself registered by the user U at the time of initialization of the image capturing device 1.

The image capturing part 11 permits the user U to capture an image on a condition that the authentication by the authenticating part 150 is successful. In other words, if the authentication by the authenticating part 150 fails, the user U cannot capture an image using the image capturing part 11. That is, a person whose biometric information is not registered in the image capturing device 1 cannot generate image data using the image capturing device 1. This ensures that the image data stored in the image capturing device 1 is data captured by the user U who has registered his/her biometric information in the image capturing device 1.

The encryptor 151 encrypts the image data captured by the image capturing part 11 to generate the encrypted data. The encrypted data generated by the encryptor 151 is stored in the image capturing device storage 14. If the image data is successfully encrypted, the encryptor 151 may delete plaintext image data. This prevents the plaintext image data from being acquired by a third party even if the information stored in the image capturing device storage 14 is leaked to a third party.

Further, the cryptographic key used by the encryptor 151 to encrypt the image data is stored in a read-only secure memory in the image capturing device storage 14 by the manufacturer of the image capturing device 1 when manufacturing the image capturing device 1. The manufacturer of the image capturing device 1 stores a different cryptographic key for each image capturing device 1.

The data output part 152 outputs the encrypted data generated by the encryptor 151 to the display device 2 via the connecting terminal 12 connected to the display device 2. The acquisition part 240 of the display device 2 acquires the encrypted data from the image capturing device 1 via the connecting terminal 22 connected to the image capturing device 1. As described above, the image capturing device 1 and the display device 2 are connected to each other through physically connecting terminals to exchange encrypted data. This makes it difficult for a third party to acquire the encrypted data while the image capturing device 1 and the display device 2 exchange the encrypted data, as compared with a case where the data is wirelessly exchanged between the image capturing device 1 and the display device 2. As a result, the information processing system S can improve the robustness of the information processing system S against leakage of the encrypted data stored in the image capturing device 1.

The decryptor 241 decrypts the encrypted data acquired by the acquisition part 240. Here, the cryptographic key used by the decryptor 241 to decrypt the encrypted data is stored in the read-only secure memory in the display device storage 23 by the manufacturer of the display device 2 when manufacturing the display device 2. The cryptographic key used by the encryptor 151 of the image capturing device 1 for encrypting the image data is paired with the cryptographic key used by the decryptor 241 of the display device 2 for decrypting the encrypted data. In other words, the decryptor 241 can decrypt the data encrypted with the cryptographic key having the encryptor 151 only by using the cryptographic key paired with said cryptographic key.

Hereafter, the cryptographic key used by the encryptor 151 to encrypt the image data is referred to as a "first cryptographic key," and the cryptographic key used by the decryptor 241 to decrypt the data encrypted with the first cryptographic key is referred to as a "second cryptographic key." The first cryptographic key is stored in the image capturing device storage 14, and the second cryptographic key is stored in the display device storage 23. The first cryptographic key and the second cryptographic key are realized by, for example, a private key and a public key of a public key cryptosystem, respectively. Thus, the image capturing device 1 storing the first cryptographic key and the display device 2 storing the second cryptographic key paring with the first cryptographic key are paired with each other.

The display 20 displays the image data decrypted and acquired by the decryptor 241. The acquisition part 240 is realized by, for example, a Liquid Crystal Display (LCD) or an organic Electroluminescence (EL) display, and is integrated with the display device 2. The display 20 may have a touch panel function, and in this case, the display 20 also functions as an input interface of the display device 2.

As described above, the image capturing device 1 and the display device 2 are paired with each other. That is, the image data captured by a certain image capturing device 1 cannot be displayed by a device other than the display device 2 paired with said image capturing device 1. The image capturing device 1 enhances the reliability of the image data stored in the image capturing device 1 in that the image data can be displayed only by a dedicated viewer device.

Further, when the connecting terminal 12 of the image capturing device 1 and the connecting terminal 22 of the display device 2 are connected, the data output part 152 of the image capturing device 1 outputs the encrypted data to the display device 2 on a condition that the authentication by the authenticating part 150 of the image capturing device 1 is successful. This allows the image capturing device 1 to prevent the image data from being transferred to the display device 2 by a person other than a person who has registered his/her biometric information in the image capturing device 1. Since only limited people can retrieve the image data from the image capturing device 1, the image capturing device 1 can improve the reliability of the storage of the image data.

The time acquisition part 153 of the image capturing device 1 acquires a time at which the image capturing part 11 captures an image. The encryptor 151 associates the encrypted image data with information indicating a capturing time of the image data to generate the encrypted data. Here, the time acquired by the time acquisition part 153 also includes the date at which the image capturing part 11 captures the image.

Consider that the image capturing part 11 captures an image of a contract and generates image data. Generally, the contract contains the date on which the contract was signed. By associating the capturing time with the image data of the captured contract, the encryptor 151 can provide information for post-hoc confirmation of whether or not the image was captured on the date on which the contract was signed.

If the date on which the contract was signed is the same as the capturing date of the image data, there is a high probability that the image data is obtained by capturing a true contract, as compared with a case where the date on which the contract was signed differs from the capturing date of the image data. The encryptor 151 generates the encrypted data by associating the encrypted image data with information indicating the capturing time of the image data, whereby the image capturing device 1 can improve the reliability of the storage of the image data.

The hash value generator 242 of the display device 2 generates a hash value of the acquired encrypted data if the encrypted data acquired from the image capturing device 1 by the acquisition part 240 differs from any piece of the encrypted data received in the past. The hash value generator 242 generates a hash value of the encrypted data using a known hash generating algorithm such as Secure Hash Algorithm version 3 (SHA3).

The hash value managing part 243 registers the hash value generated by the hash value generator 242 in the database on the network through the communication network N. Specifically, the hash value managing part 243 registers the hash value generated by the hash value generator 242 in the blockchain B configured on the communication network N. This allows the display device 2 to determine whether or not the very first encrypted data acquired from the image capturing device 1 and the subsequent encrypted data acquired from the image capturing device 1 correspond with each other. As a result, the display device 2 can confirm that no post-hoc modification has been made on the encrypted data stored in the image capturing device 1, thereby improving the reliability of the storage of the image data by the image capturing device 1.

Specifically, the hash value managing part 243 registers 1) a capturing time associated with the encrypted data generated by the hash value generator 242 and 2) an image capturing device identifier for specifying the image capturing device 1 in the blockchain B in association with the hash value. Here, the image capturing device identifier that is associated with the hash value by the hash value managing part 243 is an identifier for specifying the image capturing device that captures the image data that is the source data of the encrypted data. The image capturing device identifier is stored in the read-only secure memory in the image capturing device storage 14 by the manufacturer of the image capturing device 1 when manufacturing the image capturing device 1. The image capturing device identifier is obtained by the acquisition part 240 from the image capturing device 1 along with the encrypted data.

The hash value managing part 243 refers to the blockchain B using the image capturing device identifier and the capturing time as a key, and determines if the encrypted data acquired from the image capturing device 1 corresponds with the data already registered in the blockchain B. If the encrypted data acquired from the image capturing device 1 by the acquisition part 240 differs from any of the encrypted data received in the past, the hash value managing part 243 causes the hash value generator 242 to generate a hash value of the encrypted data and registers the hash value in the blockchain B.

The hash value managing part 243 cuts off the communication with the communication network N in response to completion of registration of the hash value in the database on the communication network N. That is, the hash value managing part 243 is off-line except when checking whether or not the hash value has already been registered in the blockchain B and when registering the hash value.

Thus, the display device 2 is normally off-line, except when it is necessary to be on-line, thereby minimizing the opportunity for a malicious third party to access the display device 2 via the communication network N. As a result, the reliability of the storage of the image data by the image capturing device 1 can be improved in the information processing system S as a whole.

FIGS. 2A and 2B show a situation where the signature Sg displayed on the display 20 of the display device 2 and the contract are compared side by side. Here, if the contract to be compared is also digitized, it is convenient because it can be used for comparison using image processing and the like.

Therefore, the display device image capturing part 21 captures an image for displaying on the display 20. The display 20 displays the image data decrypted by the decryptor 241 and the image data newly captured by the display device image capturing part 21 in a comparable manner.

Figure 4:
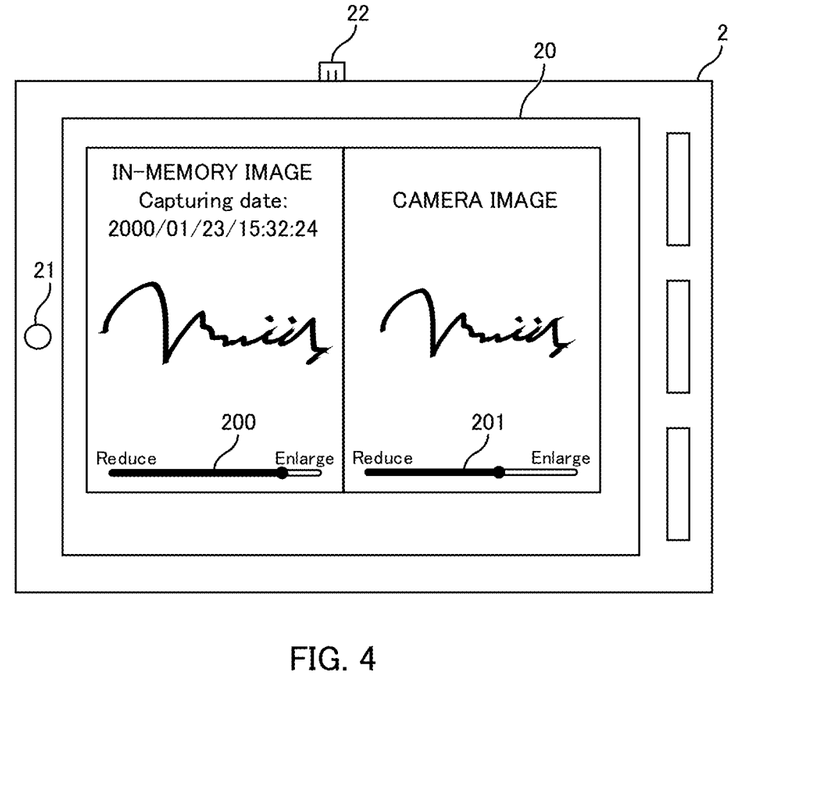
FIG. 4 schematically shows an example of a comparative screen displayed on a display according to the embodiment.

FIG. 4 schematically shows an example of a comparative screen displayed on the display 20 according to the embodiment. In the comparative screen shown in FIG. 4, an "in-memory image" stored in the image capturing device storage 14 of the image capturing device 1 and a "camera image" captured by the display device image capturing part 21 are simultaneously displayed side by side on the display 20. Enlarging/reducing interfaces 200, 201 for enlarging or reducing the images are respectively displayed on the lower parts of the in-memory image and the camera image. In addition, the capturing time of the image data is also displayed in the area for displaying the in-memory image.

If the display 20 is a touch screen, the user U can enlarge or reduce the in-memory image by operating the enlarging/reducing interface 200. Similarly, the user U can enlarge or reduce the camera image by operating the enlarging/reducing interface 201. This allows the user U to equalize the sizes of the signatures Sg included respectively in the in-memory image and the camera image, and therefore the display device 2 can provide the user U with useful information for comparing the signatures Sg.

<A Sequence Diagram for Explaining a Flow of an Information Process Executed by the Image Capturing Device 1>

Figure 5:
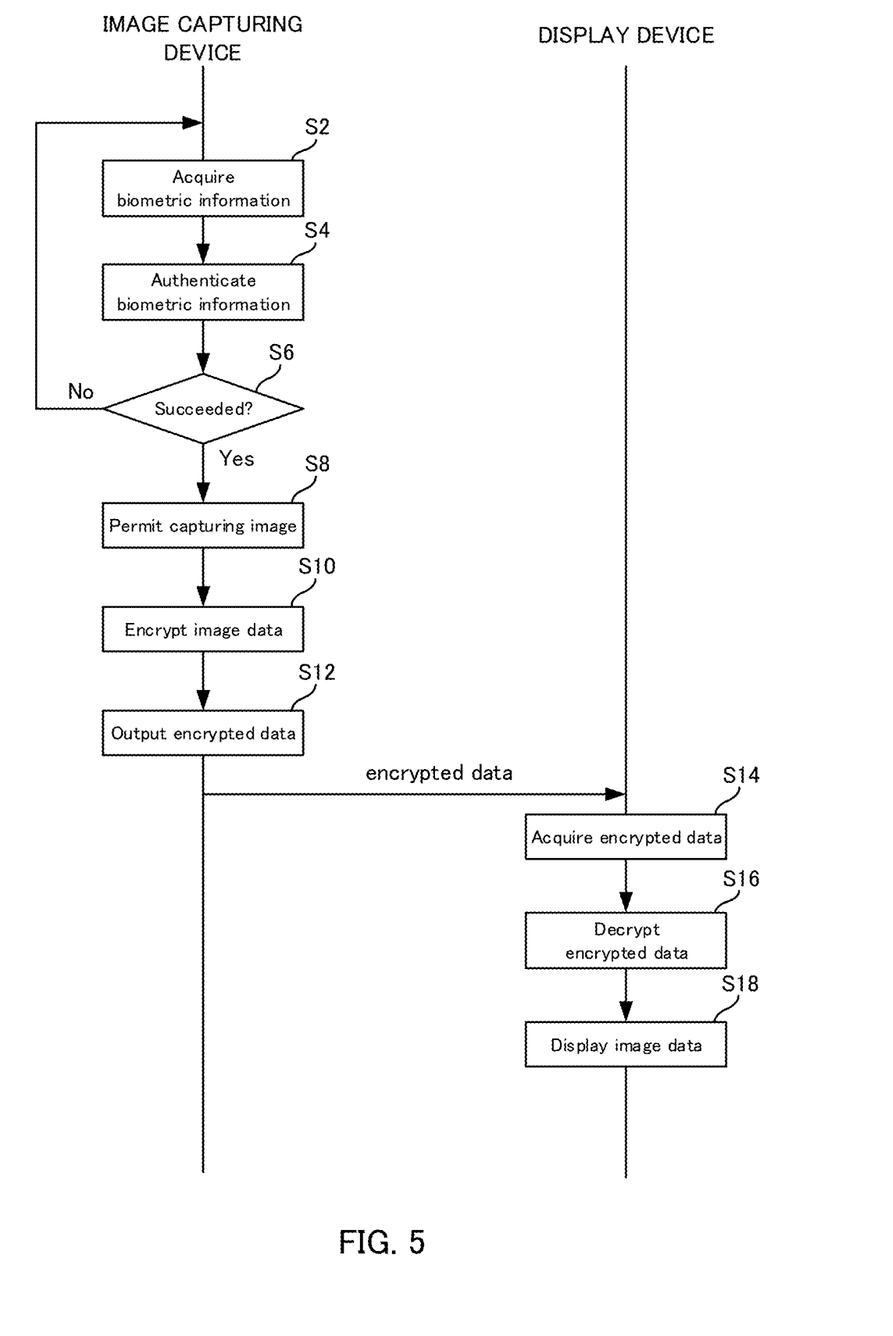
FIG. 5 is a sequence diagram for explaining a flow of an information process performed by the image capturing device according to the embodiment.

FIG. 5 is a sequence diagram for explaining a flow of an information process performed by the image capturing device 1 according to the embodiment. The process in this sequence diagram starts, for example, when the image capturing device 1 is activated.

The biometric information acquisition part 10 acquires the biometric information of the user U of the image capturing device 1 (step S2). The authenticating part 150 verifies whether the biometric information of the user U acquired by the biometric information acquisition part 10 matches the registered biometric information registered in advance (step S4). While the authentication of the biometric information is failing (NO in step S6), the image capturing device 1 returns to step S2 and continues to acquire and verify the biometric information.

If the biometric information is successfully authenticated (YES in step S6), the image capturing part 11 permits the user to capture an image (step S8). The encryptor 151 encrypts, using the first cryptographic key, the image data acquired by the image capturing part 11 capturing an image (step S10). The data output part 152 outputs the encrypted data to the display device 2 via the connecting terminal 12 connected to the display device 2 (step S12).

The acquisition part 240 of the display device 2 acquires the encrypted data from the image capturing device 1 via the connecting terminal 22 connected to the image capturing device 1 (step S14). The decryptor 241 decrypts the encrypted data acquired by the acquisition part 240 using the second cryptographic key (step S16). The display 20 displays the image data decrypted and acquired by the decryptor 241 (step S18).

<Other Use Scenes of the Information Processing System S According to the Embodiment>

A case where the user U of the information processing system S captures an image of his/her contract was explained while referencing FIG. 2A and FIG. 2B. In addition, the user U of the information processing system S may be an agent, a person in charge of legal affairs or a person in charge of accounting of a company, a public officer, or an investor. In this instance, a receipt and the like may be an imaging object in addition to the imaging object O of the image capturing device 1.

Further, in the case where the user U is an artist who produces a work or a relative thereof, the signature Sg affixed to the work or the signature Sg affixed to an appraisal document of the work may be used as the imaging object O as a part of authenticity verification or management of the work performed by the user or the relative. For this reason, the image capturing device 1 may be able to register fingerprints of a plurality of users U. In this case, the users may be classified into: 1) a user having administrative authorization who is permitted to use all functions of the image capturing device 1 including the image capturing part 11 of the image capturing device 1; and 2) a restricted user who has restrictions on use of the functions such as transferring encrypted data stored in the image capturing device 1 to the display device 2 and the like.

More specifically, for example, the user U who has registered his/her biometric information in the image capturing device 1 first may be registered as the user having administrative authorization, and a user U who registers his/her biometric information when the user having administrative authorization has already been registered may be registered as the restricted user. As described above, allowing registration of the restricted user U to only use the function of transferring the encrypted data enables the image capturing device 1 to let the relative, the designated administrator, or the like of the artist display the encrypted data of the image capturing device 1 on the display device 2 even if the artist, who is the user having administrative authorization, cannot operate the image capturing device 1 for some reason.

<Use Scene of the Image Capturing Device 1 According to the Embodiment>

For example, in the case where a licensor provides a licensee with a manufacturing license for goods related to intellectual property rights, such as a patent, design, and copyright, a license fee to be earned by the licensor is generally calculated on the basis of the sales reported by the licensee. In many cases, the sales, which are the basis for calculating the license fee, are often self-reported by the licensee, and their reliability is not always guaranteed. For this reason, the licensor often charges the licensee a slightly expensive minimum guarantee (MG) before the licensee sells the goods, which is inefficient for both parties.

Therefore, the image capturing device 1 according to the embodiment is installed in a shop for selling the goods manufactured by the licensee. A seller of the goods obtains strong evidence information by using the image capturing device 1 each time the goods go on sale to record an image of the goods themselves, a unique serial number assigned to each of the goods attached to the goods, a barcode indicating said serial number, and the like. In addition, information for identifying a person in charge of this record (for example, image data of the employee ID card if said person belongs to a company, or image data that can identify a recording location or a location of the building where the record is performed) may be recorded. Thus, the licensor may set the MG low by having the authorized seller record the sales history of the goods using the image capturing device 1 according to the embodiment. This is because the evidence of the sales history is clear, and the reliability of the sales can be guaranteed.

In addition, depending on the content of the license agreement, the license fee may be incurred at the stage where manufacturing of the goods is completed, rather than when the goods go on sale. In this instance, images of an image of the goods themselves, a unique serial number assigned to each of the goods attached to the goods, a barcode indicating said serial number, and the like may be recorded in the image capturing device 1 according to the embodiment at the time when the manufacturing of the goods is completed by the licensee. In addition, a planning material and the like may be recorded by the image capturing device 1 at the stage of preparing the material prior to the manufacture to set the license fee in advance.

As described above, use of the image capturing device 1 according to the embodiment enables management not only of the sales but also of the entire distribution network from pre-manufacturing to manufacturing and selling. The licensor collects the image capturing device 1, thereby learning the number of goods, the manufacturing location, the sales location, the person in charge, the date and time, and the like, and so the licensor can accurately confirm whether the licensee is manufacturing the number of goods and using distribution routes as contracted on the basis of information that cannot be tampered with. As a result, the license fees can be finely set according to each stage of the process, for example, $1 incurred when the goods are manufactured, $1 further incurred when the goods are shipped to the store, and $1 further incurred when the goods are sold. This enables the licensor to cooperate with someone from a region or a company he/she have never traded with without anxiety, and enables the licensee to have an opportunity to actively launch a licensing business and new businesses, even for a company with little transaction record and a company with little credit record during the start-up period of the business.

<Effect of the Image Capturing Device 1 According to the Embodiment>

As described above, according to the image capturing device 1 of the embodiment, it is possible to provide a technique for improving the reliability of the storage of the image data.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

<First Variation>

In the above description, the image capturing device 1 includes the nib 13. Alternatively, the image capturing device 1 may include a seal. This allows the user U to save time and labor for preparing a seal in addition to the image capturing device 1 if there is a document requiring a seal to be affixed.

<Second Variation>

While the image capturing device 1 including the nib 13 and the seal improves the convenience for the user U, the nib 13 and the seal are not essential components of the image capturing device 1. If the image capturing device 1 does not include the nib 13 or the seal, the image capturing device 1 functions as an image generation/storage device with a biometric authentication function. If the user U uses the image capturing device 1 to store an image of a contract and the like, he/she may prepare a pen or seal in addition to the image capturing device 1 and go through a procedure such as a contract.

<Third Variation>

In the above description, the display 20 of the display device 2 displays the in-memory image and the camera image in parallel. Additionally, the display device 2 may automatically determine whether or not the in-memory image matches the camera image. In this case, it is sufficient to provide an image comparing part (not shown in figures) in the controller 24 of the display device 2. The image comparing part determines if the image data decrypted by the decryptor 241 and the image data newly captured by the display device image capturing part 21 match. The image comparing part can be realized by using a known image processing technique such as pattern matching, for example.

<Fourth Variation>

In the above, it is mainly explained that the database on the communication network N is the blockchain B. However, the database on the communication network N is not limited to the blockchain B. A database with a format other than the blockchain B may be used, provided that security is ensured.

What is claimed is:

1. An information processing system, comprising:
an image capturing device; and
a display device that displays an image captured by the image capturing device; wherein the image capturing device includes:
a biometric information acquisition part that acquires biometric information, an authenticating part that verifies whether the biometric information acquired by the biometric information acquisition part matches registered biometric information registered in advance, an image capturing part that permits capturing of an image on a condition that authentication by the authenticating part is successful, an encryptor that encrypts image data captured by the image capturing part to generate encrypted data, and a data output part that outputs the encrypted data to the display device via a connecting terminal connected to the display device, and the display device includes:

an acquisition part that acquires the encrypted data via a terminal connected to the image capturing device, a decryptor that decrypts the encrypted data acquired by the acquisition part, a display that displays the image data decrypted and acquired by the decryptor, a hash value generator that generates a hash value of the acquired encrypted data if the encrypted data acquired by the acquisition part differs from any piece of the encrypted data received in the past, and a hash value managing part that registers the hash value in a database on a network via a communication network.

2. The information processing system according to claim 1, wherein
the data output part of the image capturing device outputs the encrypted data to the display device on a condition that the authentication in the authenticating part of the image capturing device is successful.

3. The information processing system according to claim 1, wherein
the image capturing device further includes at least one of a nib and a seal.

4. The information processing system according to claim 1, wherein
the image capturing device further includes an image capturing device storage that stores a first cryptographic key used by the encryptor to encrypt the image data, and
the display device further includes a display device storage that stores a second cryptographic key for the decryptor to decrypt the data encrypted by the first cryptographic key.

5. The information processing system according to claim 1, wherein
the display device further includes a display device image capturing part that captures an image for displaying on the display, and the display displays the image data decrypted by the decryptor and image data newly captured by the display device image capturing part in a comparable manner.

6. The information processing system according to claim 1, wherein
the image capturing device further includes a time acquisition part that acquires a time when the image capturing part captures an image, and
the encryptor associates the encrypted image data with information indicating a capturing time of the image data to generate the encrypted data.

7. The information processing system according to claim 1, wherein
the hash value managing part cuts off communication with the communication network in response to completion of registration of the hash value in the database.

8. An information processing method performed in an information processing system including an image capturing device and a display device, the method comprising:

acquiring, by the image capturing device, biometric information;

verifying, by the image capturing device, whether the acquired biometric information matches registered biometric information registered in advance;

permitting, by the image capturing device, capture an image on a condition that the authentication is successful;

encrypting, by the image capturing device, captured image data to generate encrypted data;

outputting, by the image capturing device, the encrypted data to the display device via a connecting terminal connected to the display device;

acquiring, by the display device, the encrypted data through a terminal connected to the image capturing device;

decrypting, by the display device, the acquired encrypted data;

displaying, by the display device, the decrypted and acquired image data on a display included in the display device;

generating, by the display device, a hash value of the acquired encrypted data if the acquired encrypted data differs from any piece of the encrypted data received in the past; and registering, by the display device, the hash value in a database on a network via a communication network.

* * * * *